(12) United States Patent
Herffurth et al.

(10) Patent No.: US 6,408,991 B1
(45) Date of Patent: Jun. 25, 2002

(54) PARTIAL-LINING DISK BRAKE IN THE FORM OF A FIXED-CALIPER BRAKE

(75) Inventors: Rainer Herffurth, Fuldatal; Uwe Mierisch, Baunatal, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/452,305

(22) Filed: Dec. 1, 1999

(30) Foreign Application Priority Data

Dec. 1, 1998 (DE) .......................................... 198 55 275

(51) Int. Cl.[7] .............................................. F16D 55/00
(52) U.S. Cl. .................... 188/71.1; 188/72.5; 188/73.31
(58) Field of Search ........................... 188/71.1, 73.31, 188/73.43, 18 A, 218 A, 73.45, 73.44, 370, 73.1, 73.32, 72.4, 72.5; 280/93.512, 124.125, 124.116, 124.11

(56) References Cited

U.S. PATENT DOCUMENTS

| | | | | |
|---|---|---|---|---|
| 3,896,907 A | | 7/1975 | Baxendale | |
| 5,111,914 A | * | 5/1992 | Thiel et al. | 188/73.1 X |
| 5,257,679 A | * | 11/1993 | Weiler et al. | 188/73.32 |
| 5,464,077 A | * | 11/1995 | Thiel et al. | 188/72.5 |
| 5,485,899 A | * | 1/1996 | Thiel et al. | 188/73.1 |
| 5,507,369 A | * | 4/1996 | Ferriera et al. | 188/73.45 |
| 5,560,457 A | * | 10/1996 | Rike | 188/72.4 |
| 6,062,349 A | * | 5/2000 | Boisseau et al. | 188/73.45 |

FOREIGN PATENT DOCUMENTS

| | | |
|---|---|---|
| DE | 1 965 034 | 7/1971 |
| DE | 2 148 797 | 4/1973 |
| DE | 40 36 272 | 5/1992 |
| DE | 41 29 194 | 3/1993 |
| DE | 195 30 407 | 2/1997 |

* cited by examiner

Primary Examiner—Christopher P. Schwartz
Assistant Examiner—Melanie Torres
(74) Attorney, Agent, or Firm—Kenyon & Kenyon

(57) ABSTRACT

For a partial-lining disk brake in the form of a fixed-caliper brake, there is provided an attachment that is positive in the circumferential direction and relieves braking forces on the threaded join between the brake housing and the brake carrier.

16 Claims, 1 Drawing Sheet

PARTIAL-LINING DISK BRAKE IN THE FORM OF A FIXED-CALIPER BRAKE

BACKGROUND OF THE INVENTION

1. Field of the Invention

The invention relates to a partial-lining disk brake in the form of a fixed-caliper brake for wheels of motor vehicles.

2. Description of Related Art

Partial-lining disk brakes, as fixed-caliper brakes, are known in many configurations (e.g. DE 41 29 194 A1), the brake housing being split parallel to the plane of the brake disk to be acted upon by the brake pads, and the two housing parts being immobilized with respect to one another by axial threaded joining and associated fit joins. The housing as a whole is then nonpositively immobilized with respect to the brake carrier by way of a further axial threaded join. There are thus present, with a solution of this kind, numerously highly-stressed threaded joins, of which, in particular, the threaded join located in the join to the brake carrier must ensure transmission of the entire braking force to the brake carrier.

SUMMARY OF THE INVENTION

It is an object of the invention to provide a partial-lining disk brake that is of simplified configuration despite being able to reliably transfer to the brake carrier even the maximum braking torques that occur, for example, in heavy commercial vehicles.

This and other objects of the invention are achieved by a partial-lining disk brake in the form of a fixed-caliper brake for wheels of vehicles, in particular of motor vehicles, that are rotatable about an axle spindle, having a brake carrier stationary with respect to the axle spindle and a brake housing split parallel to the brake disk plane whose housing halves are detachably braced with respect to one another and to the brake carrier, the brake carrier having a recess that receives, as counterelement, a segment of the brake housing, wherein the recess is configured as a receptacle, open radially outward at the edge, having positive engagement in the wheel rotation direction with the segment of the brake housing forming the counterelement. The advantages of the invention are the result of a positive join of the brake housing to the brake carrier, which is configured in a manner independent of rotation direction, is that the threaded join of the brake housing to the brake carrier is to the greatest possible extent relieved of the braking forces acting in the circumferential direction, and essentially serves only for positioning of the brake immobilized with respect to the brake carrier.

It is thereby also possible, according to the present invention, for the threaded joins which brace the brake housing halves axially with respect to one another simultaneously to provide threaded joining of the braking housing to the brake carrier.

DETAILED DESCRIPTION OF THE INVENTION

Figure 1:
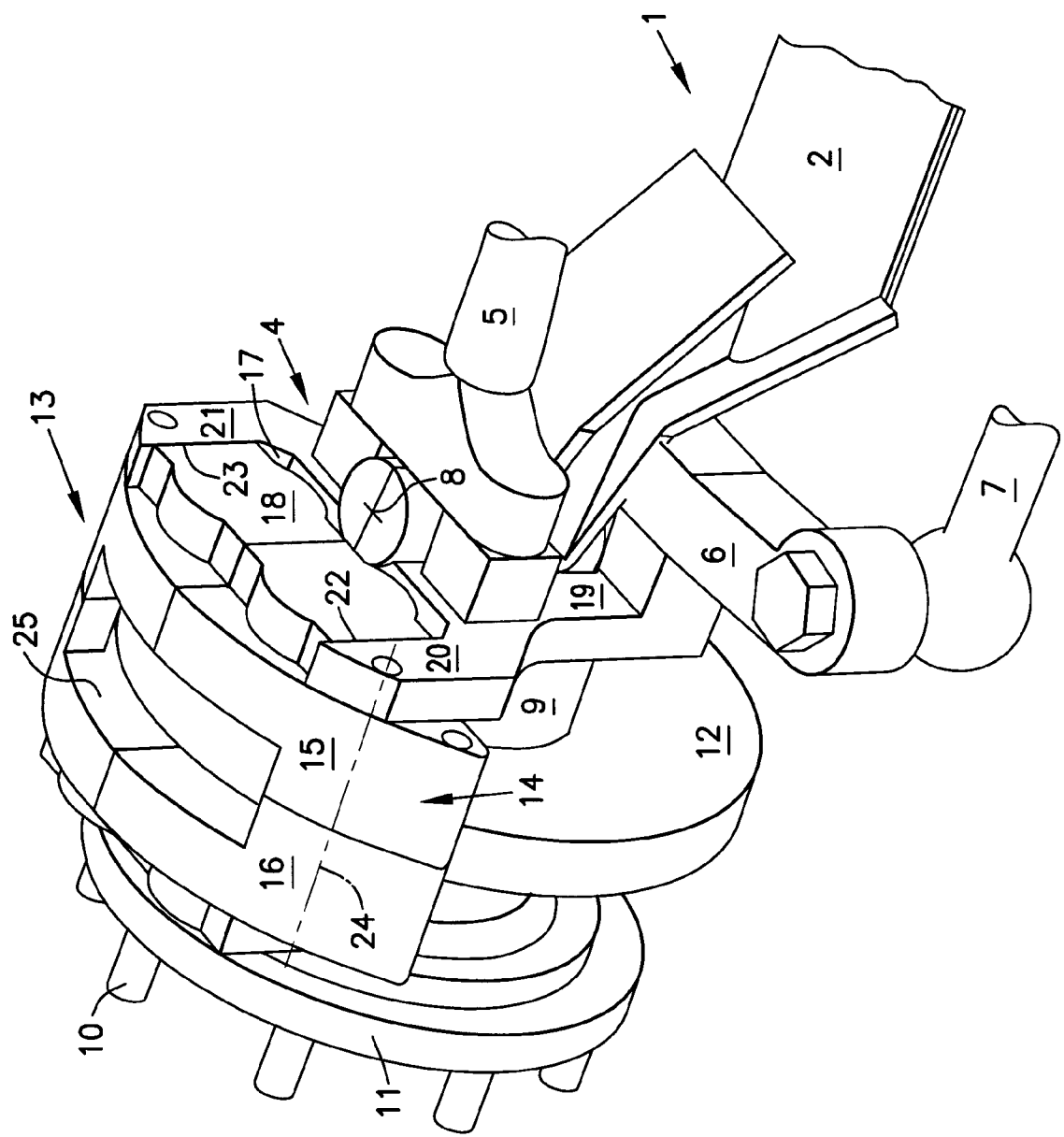
FIG. 1 is a perspective view of one embodiment of a partial-lining disk brake of the invention.

In one embodiment of the invention that is particularly simple and is also advantageous from a maintenance standpoint, the brake carrier has associated with it a receptacle, open radially outward at the edge, for a housing-side counterelement that fits in the circumferential direction; this open-edged receptacle can preferably be constituted by a forked element of the brake carrier, and the brake carrier can be part of an axle head, e.g. also part of a steerable steering knuckle, an integral constituent of the axle body or of an axle spindle.

It is advantageous for the open-edged, in particular fork-shaped, receptacle associated with the brake carrier to be configured such that the housing-side counterelement can be inserted radially. If, in this context, the housing-side counterelement is constituted in the direction toward the housing with flanks undercut in the circumferential direction, with a correspondingly opposite slope of the flanks of the fork-shaped receptacle, this additionally makes possible an axial bracing that can be used for further relief of stress on the threaded joins.

Radial insertion of the counterelement into the open-edged receptacle is possible if the flanks are parallel to one another or diverge radially outward from one another. According to the present invention, the flanks can also be radially undercut in such a way that the greatest spacing exists radially inward, resulting in dovetail-shaped guides such that the housing-side counterelement is inserted axially into the receptacle.

If, in the context of the implementation according to the present invention, the positive manner in which the brake carrier is immobilized with respect to the housing is such that both housing halves are grasped, a further decrease in the load on the threaded joins is possible. The two housing halves can be positively immobilized with respect to the brake carrier in this fashion, for example, by the fact that the receptacle is fork-shaped and the fork arms have axial extensions, associated with which are corresponding stop surfaces in the circumferential direction, at least also on the outer housing half.

A configuration that is particularly simple in terms of attachment and particularly favorable in terms of loading involves configuring the inner housing half integrally with the brake carrier, so that all that is necessary is to attach the outer housing half.

A configuration of this kind furthermore makes possible particularly favorable guidance of the supply conduits for the brake cylinders, which are associated with the inner and outer housing halves and act upon the corresponding brake pads.

In addition, an integral configuration of this kind also promotes heat dissipation from the inner housing half, since with a material that has correspondingly good thermal conductivity, the surfaces directly connected to the brake housing and exposed to the air flow are substantially increased.

FIG. 1 illustrates a highly schematized exemplary embodiment of the invention, with the head region of an undriven axle being shown in perspective. Axle 1 comprises a transverse leaf spring 2 which carries an axle head (not depicted further) which forms, for example, a stub axle that carries a vertical steering spindle on which a steering knuckle 4 is mounted. Steering knuckle 4 is, as schematically indicated, joined via a steering arm 5 to a steering gear (not depicted). Steering knuckle 4 furthermore has an arm 6 cantilevered out in the longitudinal direction; by means of this and a tie rod 7 creating the connection to the opposite wheel, the opposite wheel (not shown) is synchronously co-pivoted.

Steering knuckle 4, whose vertical steering axis determined by the steering spindle retained by the axle head is indicated at 8, carries an axle spindle 9 on which is mounted (in a manner not shown further) the wheel hub that in turn carries, in addition to wheel disk 11 carrying wheel studs 10, brake disk 12 of the disk brake; brake disk 12 lies in the longitudinal direction of axle spindle 9 between wheel disk 11 and steering axis 8.

Brake disk 12 is a constituent of a partial-lining disk brake that is labeled in its entirety as 13 and is configured in the form of a fixed-caliper brake whose housing 14 covers brake disk 12 over a portion of its circumference. Housing 14 is split along a plane parallel to brake disk 12, the splitting plane preferably coinciding with the longitudinal center plane of brake disk 12 and comprising an inner housing part 15 that lies adjacent to steering axis 8 and an outer housing part 16 that lies adjacent to wheel disk 11. Housing parts 15 and 16, extending in the circumferential direction of brake disk 12, each receive at least one brake pad (not depicted) that carries a brake lining. The brake pads are each pressed against brake disk 12 by at least one brake cylinder, so that the housing which braces the brake pads is acted upon in the circumferential direction by brake disk 12 in accordance with its rotation direction. The corresponding bracing of housing 14 is accomplished, according to the present invention, positively with respect to steering knuckle 4, which serves as the brake carrier and for that purpose, according to the exemplary embodiment, is equipped with an open-edged receptacle 17 into which a counterelement 18 of housing 14 engages with positive bracing in the circumferential direction of brake disk 12. In the schematic exemplary embodiment, counterelement 18 is constituted by an axial extension of inner housing part 15 that rests, contiguously in the circumferential direction, against counterelement 18 on corresponding contact surfaces of steering knuckle 4.

In the embodiment referred to, receptacle 17 is constituted by a forked region of steering knuckle 14, "fork upright" 19 extending approximately parallel to the steering axis, and arms 20 and 21, spaced apart from one another, having an extension approximately parallel to fork upright 19 and having flanks 22, 23, preferably parallel to one another, as contact surfaces that are associated with the circumferential end surfaces of counterelement 18, a corresponding dimensional adaptation being accomplished with an eye toward the desired positive engagement.

The configuration shown makes it possible to insert counterelement 18 radially between arms 20 and 21, and thus yields particularly favorable assembly possibilities. In particular, a configuration of this kind also makes it possible to brace housing parts 15 and 16 by way of the same threaded join (one such being schematically indicated here at 24), both against one another and against the corresponding contact surfaces of arms 20 and 21 of the forked part of steering knuckle 4. Since threaded join 24 does not, because of the positive retention of housing 14 in terms of steering knuckle 4, need to withstand the braking forces acting in the circumferential direction, said join can be of comparatively weak design.

In the context of the invention, the positive bracing can also be achieved, inverting the exemplary embodiment shown, in that inner housing part 15 optionally has a trough-shaped receptacle for a corresponding calibrated guide element of the steering knuckle. It is moreover also possible, as a development of the exemplary embodiment shown, to equip arms 20 and 21, or at least one of said arms, with an axial prolongation that extends at least over a portion of housing parts 15 and 16 and radially overlaps them so as to result optionally, for both parts of the housing, in a direct positive bracing with which the forces to be handled via the threaded join can be further decreased.

According to the present invention, a simplification of the overall construction and a simplification in the attachment of the housing to steering knuckle 4 can furthermore be achieved in that the inner housing part is configured integrally with the steering knuckle, i.e. forms a module that simply needs to be added to the other housing part in order to complete the housing. The bracing of the outer housing part necessary in the circumferential direction can, in this context, be effected via separate dowel pins or locating sleeves or by guide segments, associated with the threaded joins and acting as dowel pins, that form, in the transition region between the housing halves, a centering thereof with respect to one another. Corresponding implementations are, of course, also possible for housing configurations having two housing halves, as set forth above and in which the housing is not integral with the steering knuckle.

In the exemplary embodiment described here, housing halves 15 and 16 delimit in known fashion, in the region covering the brake disk, a recess 25 running in the circumferential direction, which are advantageous for access to the brake pads and/or replacement of the brake pads.

The example described here serves solely to illustrate the invention, and the bracing and configuration of the brake housing described here can of course be transferred to other axle types, in particular also to unsteered and/or to driven axles.

What is claimed is:

1. A partial-lining disk brake in the form of a fixed-caliper brake for wheels of vehicles that are rotatable about an axle spindle, having a brake housing carrier stationary with respect to the axle spindle and a brake housing split parallel to the brake disk plane whose housing halves are detachably braced with respect to one another and to the brake housing carrier, the brake housing carrier having a recess that receives, as counterelement, a segment of the brake housing,
   wherein the recess is configured as a receptacle, open radially outward at the edge, having positive engagement in the wheel rotation direction with the segment of the brake housing forming the counterelement.

2. The partial-lining disk brake according to claim 1, wherein the receptacle provided in the brake housing carrier is configured as a fork.

3. The partial-lining disk brake according to claim 1, wherein the housing-side counterelement is inserted radially into the receptacle.

4. The partial-lining disk brake according to claim 2, wherein the housing-side counterelement is inserted radially into the receptacle.

5. The partial-lining disk brake according to claim 2, wherein flanks of fork arms facing one another in the circumferential direction lie parallel to one another.

6. The partial-lining disk brake according to claim 3, wherein flanks of fork arms facing one another in the circumferential direction lie parallel to one another.

7. The partial-lining disk brake according to claim 5, wherein the flanks of the fork arms facing one another in the circumferential direction lie parallel to a radial plane.

8. The partial-lining disk brake according to claim 7, wherein the flanks of the fork arms facing one another in the circumferential direction lie parallel to a radial plane.

9. The partial-lining disk brake according to claim 1, wherein flanks of fork arms facing one another in the circumferential direction enclose an angle that opens radially outward.

10. The partial-lining disk brake according to claim 2, wherein flanks of fork arms facing one another in the circumferential direction enclose an angle that opens radially outward.

11. The partial-lining disk brake according to claim 1, wherein flanks of fork arms facing one another in the circumferential direction enclose an angle that opens radially inward, into which the counterelement can be inserted axially.

12. The partial-lining disk brake according to claim 2, wherein flanks of fork arms facing one another in the circumferential direction enclose an angle that opens radially inward, into which the counterelement can be inserted axially.

13. The partial-lining disk brake according to claim 2, wherein the segment of the brake housing forming the counterelement is associated with a housing part adjacent to the brake housing carrier.

14. The partial-lining disk brake according to claim 2, wherein the segment of the brake housing forming the counterelement is associated with a housing part adjacent to the brake housing carrier.

15. The partial-lining disk brake according to claim 1, wherein the segment of the brake housing forming the counterelement is associated with both of its housing halves.

16. The partial-lining disk brake according to claim 2, wherein the segment of the brake housing forming the counterelement is associated with both of its housing halves.

* * * * *